(12) United States Patent
Dierksmeier et al.

(10) Patent No.: US 10,731,663 B2
(45) Date of Patent: *Aug. 4, 2020

(54) AXIAL COMPRESSOR WITH RADIALLY OUTER ANNULUS

(71) Applicant: Rolls-Royce North American Technologies, Inc., Indianapolis, IN (US)

(72) Inventors: Douglas D. Dierksmeier, Franklin, IN (US); Edward C. Rice, Indianapolis, IN (US); Ryan C. Humes, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 775 days.

This patent is subject to a terminal disclaimer.

(21) Appl. No.: 15/384,135

(22) Filed: Dec. 19, 2016

(65) Prior Publication Data

US 2017/0363089 A1 Dec. 21, 2017

Related U.S. Application Data

(63) Continuation-in-part of application No. 15/188,721, filed on Jun. 21, 2016.

(51) Int. Cl.
*F04D 29/58* (2006.01)
*F04D 29/52* (2006.01)
*F01D 25/26* (2006.01)

(52) U.S. Cl.
CPC .......... *F04D 29/584* (2013.01); *F01D 25/26* (2013.01); *F04D 29/522* (2013.01); *F04D 29/5853* (2013.01); *F05D 2230/50* (2013.01); *F05D 2230/51* (2013.01); *F05D 2300/612* (2013.01); *Y02T 50/672* (2013.01)

(58) Field of Classification Search
None
See application file for complete search history.

(56) References Cited

U.S. PATENT DOCUMENTS

| 3,597,106 | A | * | 8/1971 | Anderson | F04D 27/0215 |
| | | | | | 415/144 |
| 4,329,114 | A | * | 5/1982 | Johnston | F01D 11/24 |
| | | | | | 415/116 |
| 5,314,303 | A | * | 5/1994 | Charbonnel | F01D 11/18 |
| | | | | | 415/115 |
| 8,734,091 | B2 | * | 5/2014 | Moniz | F01D 17/105 |
| | | | | | 415/144 |
| 2014/0157757 | A1 | | 6/2014 | Hasel et al. | |

FOREIGN PATENT DOCUMENTS

WO 2003/089792 A1 10/2003

* cited by examiner

*Primary Examiner* — Kayla McCaffrey
(74) *Attorney, Agent, or Firm* — Barnes & Thornburg LLP

(57) ABSTRACT

An axial compressor comprises a plurality of compressor stages positioned axially adjacent each other within a casing. Each of the plurality of compressor stages includes a rotor segment and a banded stator segment. An annulus is formed between the casing and an outer flowpath ring of the banded stator segment. A pathway may be provided that establishes an air flowpath between the annulus and another annulus formed by an adjacent stage.

20 Claims, 15 Drawing Sheets

AXIAL COMPRESSOR WITH RADIALLY OUTER ANNULUS

CROSS REFERENCE TO RELATED APPLICATIONS

The present application is a continuation-in-part of U.S. patent application Ser. No. 15/188,721 filed Jun. 21, 2016, the entirety of which is hereby incorporated by reference.

FIELD OF THE DISCLOSURE

The present disclosure relates generally to fluid compression, and more specifically to an axial compressor assembly.

BACKGROUND

Axial-flow compressors are used in a variety of applications to compress a fluid from an inlet pressure to a discharge pressure which is higher than inlet pressure. Axial-flow compressors typically comprise a rotatable assembly of a plurality of blades mounted to a rotor and a static assembly of a plurality of vanes mounted to a casing. The cross-sectional area of the fluid passage in an axial-flow compressor typically decreases as the fluid travels from inlet to discharge. In operation, the rotating blades accelerate the fluid into a diminishing cross-sectional area, thus compressing or pressurizing the fluid.

Applications of axial-flow compressors include, but are not limited to, gas turbine engines including those used in air-, land-, and sea-based applications for providing electrical generation and/or propulsion, expendable machines such as for missile propulsion systems, and other rotating machinery generally. In many applications there is a need in the art for axial compressors which can be achieved at a lower cost of manufacture and operation. Efforts to reduce the cost of manufacture have included, for example, the substitution of metal engine components with those made of lightweight composite materials which tend to be less expensive to procure and machine to achieve the desired compressor components. However, material substitution alone is insufficient to achieve the desired cost savings when manufacturing and operating an axial compressor, particularly for expendable applications where the manufacturing cost is lost after a single use.

It is thus desired for an improvement in the art of manufacturing and operating axial compressors to provide less expensive alternatives to existing designs.

SUMMARY

The present application discloses one or more of the features recited in the appended claims and/or the following features which, alone or in any combination, may comprise patentable subject matter.

According to an aspect of the present disclosure, an axial compressor comprises a plurality of compressor stages and a casing configured to encase the plurality of compressor stages positioned axially adjacent within the casing. Each of the plurality of compressor stages comprises a rotor segment comprising a bladed disc configured to be coupled to a rotatable shaft; a banded stator segment positioned axially adjacent the rotor segment, the stator segment comprising an outer flowpath ring, an inner flowpath ring, and a plurality of vanes extending between the rings and being spaced around the circumferences thereof, the stator segment further comprising one or more tangs extending radially outward from the outer flowpath ring to engage the casing and thereby space the outer flowpath ring radially inward from the casing forming an annulus between the casing and the outer flowpath ring; and a pathway providing an air flowpath between the annulus and the annulus formed by an adjacent stage.

In some embodiments a pathway in at least one of the stages comprises an aperture formed in the one or more tangs. In some embodiments the axial compressor further comprises an entry pathway in a first of the stages providing an air flowpath between the main flowpath of the compressor stage and the annulus of the stage; and an exit pathway in a second of the stages positioned axially downstream of the first stage, the exit pathway providing an air flowpath between the annulus of the stage and the exterior of the casing. In some embodiments the second stage is the final downstream stage of the compressor.

In some embodiments the first stage is one of the first or second axially upstream stages of the compressor. In some embodiments the stator segment most proximate the entry pathway comprises a plurality of actuating stator vanes. In some embodiments the pathway is defined by a tube extending between the entry pathway and the exit pathway. In some embodiments air flow through the pathway is induced by a differential pressure between the air pressure proximate the entry pathway and the air pressure proximate the exit pathway, and wherein the differential pressure is caused by operation of the axial compressor.

According to another aspect of the present disclosure, an axial compressor comprises a plurality of compressor stages and a casing configured to encase the plurality of compressor stages positioned axially adjacent within the casing. Each of the plurality of compressor stages comprise a rotor segment comprising a bladed disc configured to be coupled to a rotatable shaft; a banded stator segment positioned axially adjacent the rotor segment, the stator segment comprising an outer flowpath ring, an inner flowpath ring, and a plurality of vanes extending between the rings and being spaced around the circumferences thereof, the stator segment further comprising one or more tangs extending radially outward from the outer flowpath ring to engage the casing and thereby space the outer flowpath ring radially inward from the casing forming an annulus between the casing and the outer flowpath ring; and a pathway providing an air flowpath between an entry aperture and an exit aperture, the entry aperture disposed in a first of the compressor stages and providing an air flowpath between the bulk flowpath of the compressor stage and the annulus of the stage and the exit aperture disposed in a second of the stages positioned axially downstream of the first stage, the exit aperture providing an air flowpath between the annulus of the stage and the exterior of the casing, wherein the entry aperture and the exit aperture are in fluid communication.

In some embodiments the annulus of one or more of the stator segments is substantially filled with a filler. In some embodiments the filler at least partially defines the pathway. In some embodiments the filler comprises a metallic foam. In some embodiments the filler has a higher thermal conductivity in the radial direction than in the axial direction. In some embodiments a plurality of pathways are defined by the filler between the entry aperture and the exit aperture. In some embodiments the pathway in at least one of the stages comprises an aperture formed in the one or more tangs. In some embodiments the stator segment most proximate the entry aperture comprises a plurality of actuating stator vanes.

According to another aspect of the present disclosure, a method of cooling an axial compressor comprises providing a plurality of compressor stages encased in a casing, the plurality of compressor stages positioned axially adjacent within the casing and each of the plurality of compressor stages comprise a rotor segment comprising a bladed disc configured to be coupled to a rotatable shaft; a banded stator segment positioned axially adjacent the rotor segment, the stator segment comprising an outer flowpath ring, an inner flowpath ring, and a plurality of vanes extending between the rings and being spaced around the circumferences thereof, the stator segment further comprising one or more tangs extending radially outward from the outer flowpath ring to engage the casing and thereby space the outer flowpath ring radially inward from the casing forming an annulus between the casing and the outer flowpath ring; providing a pathway between an entry pathway and an exit pathway, the entry pathway disposed in a first of the compressor stages and providing an air flowpath between the bulk flowpath of the compressor stage and the annulus of the stage and the exit pathway disposed in a second of the stages positioned axially downstream of the first stage, the exit pathway providing an air flowpath between the annulus of the stage and the exterior of the casing, wherein the entry pathway and the exit pathway are in fluid communication; and introducing air flow through the pathway.

In some embodiments the step of introducing air flow through the pathway comprises operating the compressor to establish a differential pressure between the air pressure proximate the entry pathway and the air pressure proximate the exit pathway. In some embodiments the method further comprises the step of actuating a plurality of vanes of a stator segment most proximate the entry pathway to alter the vane angle relative to the direction of bulk flow. In some embodiments the annulus of one or more of the stator segments is substantially filled with a filler comprising a metallic foam, and wherein the filler at least partially defines the pathway.

According to yet another aspect of the present disclosure, an axial compressor comprises a plurality of compressor stages and a casing configured to encase the plurality of compressor stages positioned axially adjacent within the casing. Each of the plurality of compressor stages comprise a rotor segment comprising a bladed disc configured to be coupled to a rotatable shaft; a banded stator segment positioned axially adjacent the rotor segment, the stator segment comprising an outer flowpath ring, an inner flowpath ring, and a plurality of vanes extending between the rings and being spaced around the circumferences thereof, the stator segment further comprising one or more tangs extending radially outward from the outer flowpath ring to engage the casing and thereby space the outer flowpath ring radially inward from the casing forming an annulus between the casing and the outer flowpath ring; and wherein each of the plurality of vanes comprises a member extending into the annulus.

In some embodiments the axial compressor further comprises a pathway providing an air flowpath between the annulus and the annulus formed by an adjacent stage. In some embodiments a pathway in at least one of the stages comprises an aperture formed in the one or more tangs. In some embodiments the axial compressor further comprises an entry pathway in a first of the stages providing an air flowpath between the main flowpath of the compressor stage and the annulus of the stage; and an exit pathway in a second of the stages positioned axially downstream of the first stage, the exit pathway providing an air flowpath between the annulus of the stage and the exterior of the casing.

In some embodiments the second stage is the final downstream stage of the compressor. In some embodiments the first stage is one of the first or second axially upstream stages of the compressor. In some embodiments the stator segment most proximate the entry pathway comprises a plurality of actuating stator vanes. In some embodiments the pathway is defined by a tube extending between the entry pathway and the exit pathway. In some embodiments air flow through the pathway is induced by a differential pressure between the air pressure proximate the entry pathway and the air pressure proximate the exit pathway, and wherein the differential pressure is caused by operation of the axial compressor. In some embodiments each of the members passes through a respective aperture of the outer flowpath ring.

According to a further aspect of the present disclosure, an axial compressor comprises a plurality of compressor stages and a casing configured to encase the plurality of compressor stages positioned axially adjacent within the casing. Each of the plurality of compressor stages comprise a rotor segment comprising a bladed disc configured to be coupled to a rotatable shaft; a banded stator segment positioned axially adjacent the rotor segment, the stator segment comprising an outer flowpath ring, an inner flowpath ring, and a plurality of vanes extending between the rings and being spaced around the circumferences thereof, the stator segment further comprising one or more tangs extending radially outward from the outer flowpath ring to engage the casing and thereby space the outer flowpath ring radially inward from the casing forming an annulus between the casing and the outer flowpath ring and wherein the annulus is substantially filled with a filler that defines one or more pathways between the annulus and the annulus formed by an adjacent stage; and wherein each of the plurality of vanes comprises a member extending into the annulus.

In some embodiments the annulus of one or more of the stator segments is substantially filled with a filler. In some embodiments the filler comprises a metallic foam. In some embodiments the filler has a higher thermal conductivity in the radial direction than in the axial direction. In some embodiments the pathway comprises an air flowpath between an entry aperture and an exit aperture, the entry aperture disposed in a first of the compressor stages and providing an air flowpath between the bulk flowpath of the compressor stage and the annulus of the stage and the exit aperture disposed in a second of the stages positioned axially downstream of the first stage, the exit aperture providing an air flowpath between the annulus of the stage and the exterior of the casing, wherein the entry aperture and the exit aperture are in fluid communication.

In some embodiments a plurality of pathways are defined by the filler between the entry aperture and the exit aperture. In some embodiments the pathway in at least one of the stages comprises an aperture formed in the one or more tangs.

According to another aspect of the present disclosure, a method is provided of intercooling an axial compressor. The method comprises providing a plurality of compressor stages encased in a casing, the plurality of compressor stages positioned axially adjacent within the casing and each of the plurality of compressor stages comprise a rotor segment comprising a bladed disc configured to be coupled to a rotatable shaft; a banded stator segment positioned axially adjacent the rotor segment, the stator segment comprising an outer flowpath ring, an inner flowpath ring, and a plurality of vanes extending between the rings and being spaced around the circumferences thereof, the stator segment further comprising one or more tangs extending radially outward from the outer flowpath ring to engage the casing and thereby space the outer flowpath ring radially inward from the casing forming an annulus between the casing and the outer flowpath ring, and wherein each of the plurality of vanes comprises a member extending into the respective annulus; providing a pathway between an entry pathway and an exit pathway, the entry pathway disposed in a first of the compressor stages and providing an air flowpath between the bulk flowpath of the compressor stage and the annulus of the stage and the exit pathway disposed in a second of the stages positioned axially downstream of the first stage, the exit pathway providing an air flowpath between the annulus of the stage and the exterior of the casing, wherein the entry pathway and the exit pathway are in fluid communication; and introducing air flow through the pathway.

In some embodiments the step of introducing air flow through the pathway comprises operating the compressor to establish a differential pressure between the air pressure proximate the entry pathway and the air pressure proximate the exit pathway. In some embodiments the method further comprises the step of actuating a plurality of vanes of a stator segment most proximate the entry pathway to alter the vane angle relative to the direction of bulk flow.

According to yet another aspect of the present disclosure, an axial compressor comprises a plurality of compressor stages and a casing configured to encase the plurality of compressor stages positioned axially adjacent within the casing. Each of the plurality of compressor stages comprise a rotor segment comprising a bladed disc configured to be coupled to a rotatable shaft; a banded stator segment positioned axially adjacent the rotor segment, the stator segment comprising an outer flowpath ring, an inner flowpath ring, and a plurality of vanes extending between the rings and being spaced around the circumferences thereof, the stator segment further comprising one or more tangs extending radially outward from the outer flowpath ring to engage the casing and thereby space the outer flowpath ring radially inward from the casing forming an annulus between the casing and the outer flowpath ring; and a pathway providing an air flowpath between an entry pathway and an exit pathway, the entry pathway disposed in a first of the stages and providing an air flowpath between the bulk flowpath of the compressor stage and the annulus of the stage and the exit pathway disposed in a second of the stages positioned axially upstream of the first stage, the exit pathway providing an air flowpath between the annulus of the stage and the bulk flowpath of the compressor stage, wherein the entry pathway and the exit pathway are in fluid communication.

In some embodiments a pathway in at least one of the stages comprises an aperture formed in the one or more tangs. In some embodiments the first stage is the final downstream stage of the compressor. In some embodiments the second stage is one of the first or second axially upstream stages of the compressor. In some embodiments the stator segment most proximate the entry pathway comprises a plurality of actuating stator vanes. In some embodiments the entry pathway is disposed axially forward of a final rotor segment of the compressor. In some embodiments the entry pathway is disposed axially aft of a final rotor segment of the compressor.

In some embodiments the entry pathway is disposed at a discharge of the compressor. In some embodiments the entry pathway comprises a first aperture disposed axially forward of a final rotor segment of the compressor and a second aperture disposed axially aft of a final rotor segment of the compressor. In some embodiments air flow through the pathway is induced by a differential pressure between the air pressure proximate the entry pathway and the air pressure proximate the exit pathway, and wherein the differential pressure is caused by operation of the axial compressor.

In some embodiments the exit pathway comprises a plurality of nozzles defined by and passing through the outer flowpath ring. In some embodiments the exit pathway comprises a plurality of nozzles defined by and passing through one or more of the plurality of vanes. In some embodiments the plurality of nozzles are disposed proximate a trailing edge of a respective one of the vanes.

According to still another aspect of the present disclosure, an axial compressor comprises a plurality of compressor stages; a casing configured to encase the plurality of compressor stages positioned axially adjacent within the casing, wherein each of the plurality of compressor stages comprise a rotor segment comprising a bladed disc configured to be coupled to a rotatable shaft; a banded stator segment positioned axially adjacent the rotor segment, the stator segment comprising an outer flowpath ring, an inner flowpath ring, and a plurality of vanes extending between the rings and being spaced around the circumferences thereof, the stator segment further comprising one or more tangs extending radially outward from the outer flowpath ring to engage the casing and thereby space the outer flowpath ring radially inward from the casing forming an annulus between the casing and the outer flowpath ring; and a pathway providing an air flowpath between an entry pathway and an exit pathway, the pathway comprising a tube extending from the entry pathway to the exit pathway, wherein the entry pathway is disposed in a first of the stages and provides an air flowpath between the bulk flowpath of the compressor stage and the annulus of the stage, and the exit pathway is disposed in a second of the stages positioned axially upstream of the first stage, the exit pathway providing an air flowpath between the annulus of the stage and the bulk flowpath of the compressor stage, wherein the entry pathway and the exit pathway are in fluid communication.

In some embodiments the entry pathway is disposed axially forward of a final rotor segment of the compressor. In some embodiments the entry pathway is disposed axially aft of a final rotor segment of the compressor. In some embodiments the entry pathway comprises a first aperture disposed axially forward of a final rotor segment of the compressor and a second aperture disposed axially aft of a final rotor segment of the compressor.

In some embodiments the exit pathway comprises a plurality of nozzles defined by and passing through the outer flowpath ring. In some embodiments the exit pathway comprises a plurality of nozzles defined by and passing through one or more of the plurality of vanes, and wherein the plurality of nozzles are disposed proximate a trailing edge of a respective one of the vanes.

According to a further aspect of the present disclosure, a method is provided of improving the efficiency of an axial compressor. The method comprises providing a plurality of compressor stages encased in a casing, the plurality of compressor stages positioned axially adjacent within the casing and each of the plurality of compressor stages comprising: a rotor segment comprising a bladed disc configured to be coupled to a rotatable shaft; a banded stator segment positioned axially adjacent the rotor segment, the stator segment comprising an outer flowpath ring, an inner flowpath ring, and a plurality of vanes extending between the rings and being spaced around the circumferences thereof, the stator segment further comprising one or more tangs extending radially outward from the outer flowpath ring to engage the casing and thereby space the outer flowpath ring radially inward from the casing forming an annulus between the casing and the outer flowpath ring; providing a pathway between an entry pathway and an exit pathway, the entry pathway disposed in a first of the stages and providing an air flowpath between the bulk flowpath of the compressor stage and the annulus of the stage and the exit pathway disposed in a second of the stages positioned axially upstream of the first stage, the exit pathway providing an air flowpath between the annulus of the stage and the bulk flowpath of the compressor stage, wherein the entry pathway and the exit pathway are in fluid communication; and introducing air flow through the pathway.

In some embodiments the step of introducing air flow through the pathway comprises operating the compressor to establish a differential pressure between the air pressure proximate the entry pathway and the air pressure proximate the exit pathway. In some embodiments the exit pathway comprises a plurality of nozzles defined by and passing through the outer flowpath ring. In some embodiments the exit pathway comprises a plurality of nozzles defined by and passing through one or more of the plurality of vanes, and wherein the plurality of nozzles are disposed proximate a trailing edge of a respective one of the vanes.

BRIEF DESCRIPTION OF THE DRAWINGS

The following will be apparent from elements of the figures, which are provided for illustrative purposes and are not necessarily to scale.

Figure 1A:
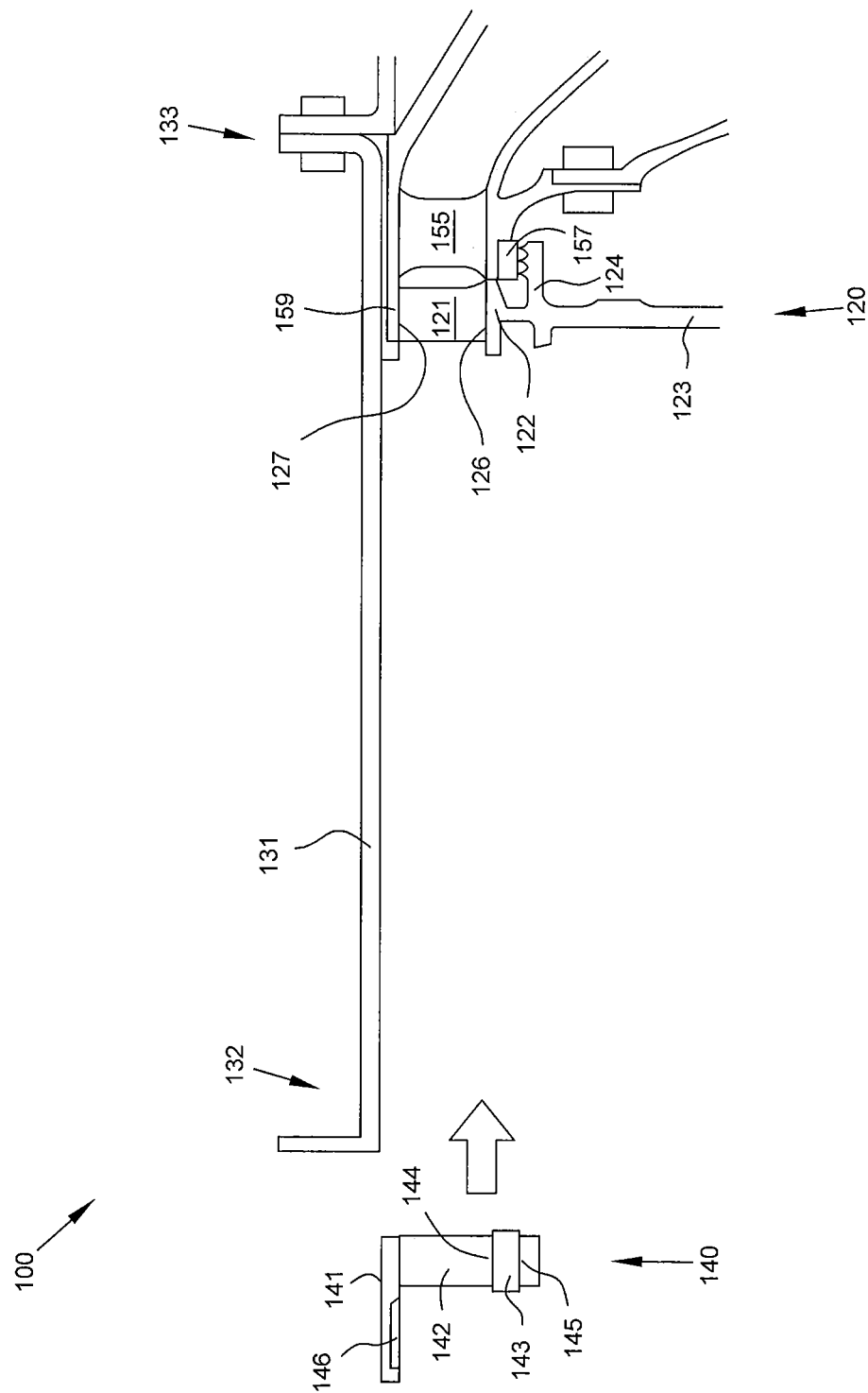
FIG. 1A is a side cutaway view of a partially-assembled axial compressor in accordance with some embodiments of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents systems and methods of manufacturing and assembling an axial-flow compressor to achieve a less expensive compressor than is currently available in the art. More specifically, the present disclosure is directed to an axial-flow compressor which comprises a tubular casing which encases a rotatable shaft, a pair of rotor segments coupled to the rotatable shaft and each comprising a bladed disc, and a banded stator segment disposed between the pair of rotor segments and comprising a plurality of stator vanes extending between an outer flowpath ring and an inner flowpath ring. A method of assembling an axial compressor is further presented, the method comprising installing a rotor segment inside a tubular compressor casing, installing a vane segment adjacent the installed rotor segment, and repeating the steps of installing a rotor segment and vane segment until a desired number of rotor segment and vane segment pairs are installed.

Figure 1B:
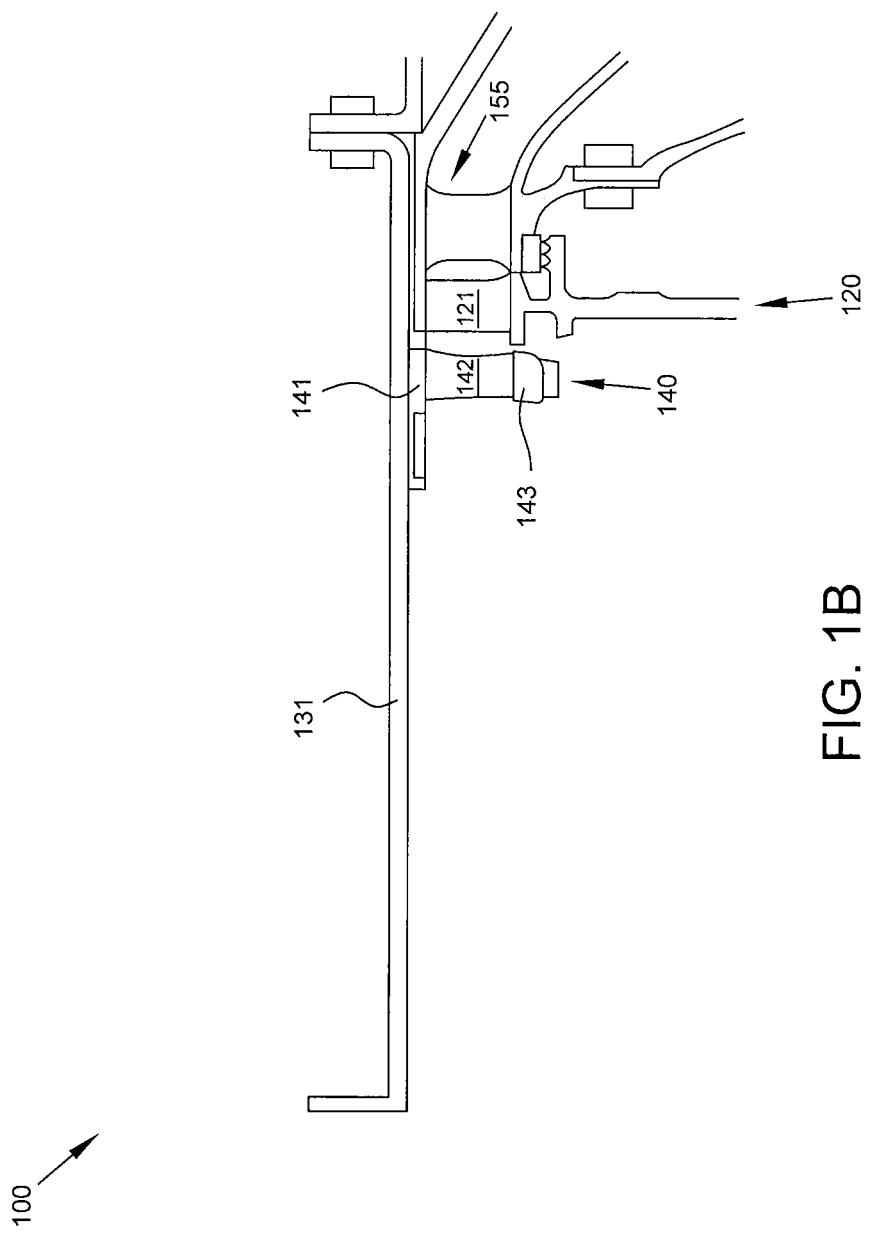
FIG. 1B is a side cutaway view of a partially-assembled axial compressor in accordance with some embodiments of the present disclosure.
Figure 1C:
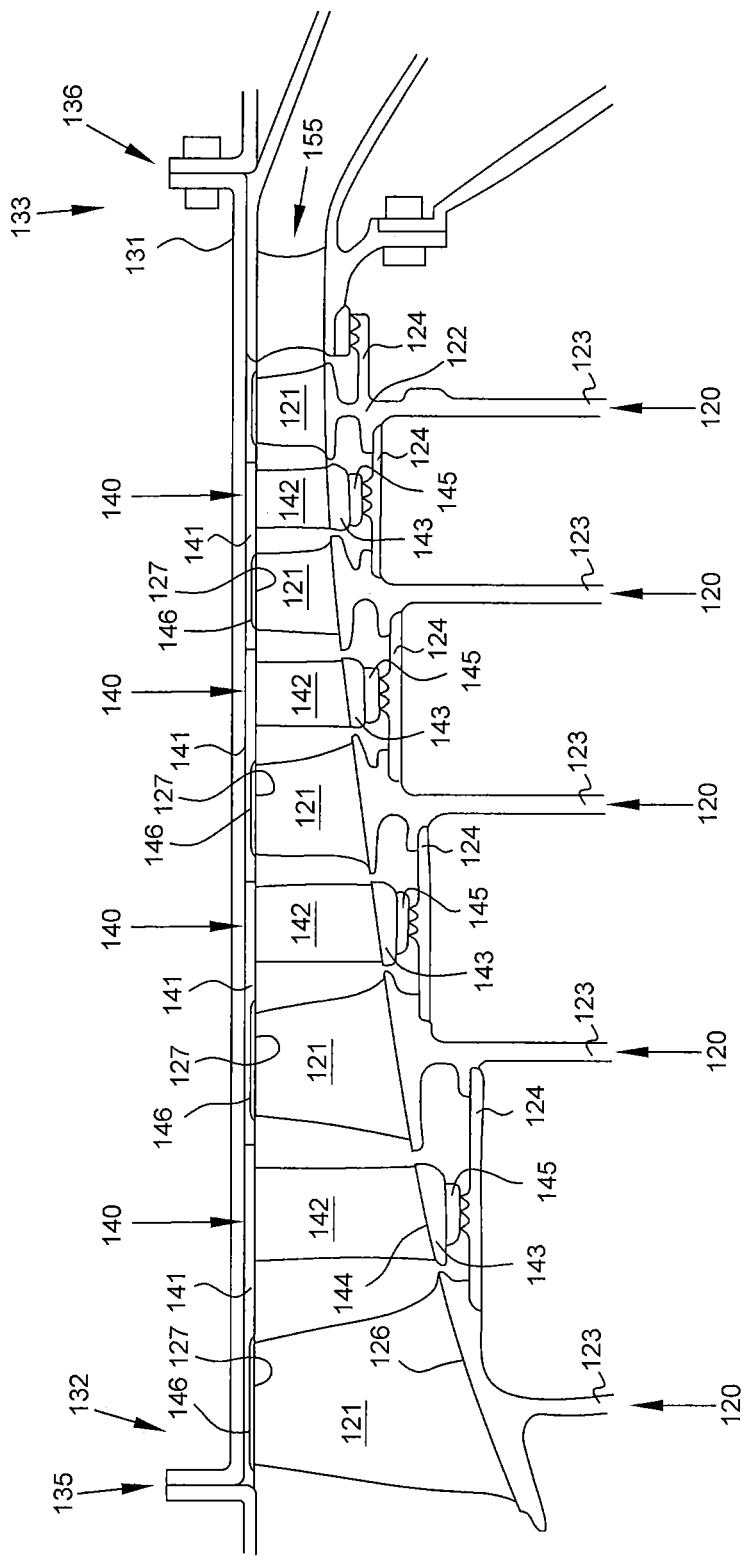
FIG. 1C is a side cutaway view of an axial compressor in accordance with some embodiments of the present disclosure.

FIGS. 1A through 1C present illustrations of the assembly process for the disclosed an axial compressor 100. FIGS. 1A and 1B show views of a partially assembled axial compressor 100, while a fully assembled axial compressor 100 is shown in FIG. 1C.

An axial compressor 100 comprises a rotatable assembly 110 and a static assembly 130. The rotatable assembly 110 may be coupled to a shaft and adapted to rotate about an axis of rotation. The rotatable assembly 110 comprises a plurality of rotor segments 120. The static assembly 130 comprises a casing 131 which encases the rotatable assembly 110 and a plurality of stator segments 140 disposed in the casing 131.

A fluid flow path is defined through the axial compressor 100 between the casing 131 and a radially inner flow boundary 134 formed by the rotor segments 120 and stator segments 140. As fluid passes from an axially forward end of the compressor 100 to an axially aft end, it passes between blades 121 of the rotor segments 120 and stator vanes 141 of the stator segments 140.

Casing 131 may be a tubular casing or a cylindrical casing, and in some embodiments may be tapered from one axial end to the other axial end. Casing 131 may comprise a first end 132 and second end 133, with the first end 132 being axially forward of the second end 133. In some embodiments casing 131 is conical. A conical casing 131 may have a smaller radius at second end 133 than at first end 132. In some embodiments casing 131 may be formed by a rolled ring forging or a rolled and welded plate stock. In some embodiments casing 131 may be formed by casting or by a composite and resin method such as a wound composite fiber coated with resin and cured.

Casing 131 may be configured to contain axial fluid flow from first end 132 to second end 133. In other embodiments casing 131 may be configured to contain axial fluid flow from second end 133 to first end 132. Casing 131 may be adapted to encase a plurality of rotor segments 120, a plurality of stator segments 140, and a shaft 150. Casing 131 may be joined by forward and aft flanges 135, 136 to additional machine components.

A plurality of rotor segments 120 are disposed inside casing 131. In some embodiments each rotor segment 120 comprises a bladed disc having a plurality of blades 121 coupled to a disc portion 123. Disc portion 123 may be adapted for coupling to shaft 150. In some embodiments each rotor segment 120 comprises a blade 121 coupled to an annular ring 122 having a disc portion 123 for connecting the rotor segment 120 to the shaft 150. Each rotor segment 120 may be referred to as a stage of the compressor.

In some embodiments rotor segment includes an axially-extending sealing arm 124. Sealing arm 124 may be formed integrally with the annular ring 122 or may be formed separately and coupled to annular ring 122. In some embodiments sealing arm 124 may have a plurality of annular knife edges 125 extending radially outward and adapted to engage a portion of a stator segment 140 in order to effectively form a seal. The seal may be referred to as a knife edge seal. In some embodiments the seal formed is a labyrinth seal.

During operation, rotor segments 120, including any sealing arms 124, rotate with shaft 150. The motion of blades 121 drives fluid from the axially forward first end 132 to the axially aft second end 133.

A plurality of stator segments 140 are disposed inside casing 131. Each stator segment 140 comprises an outer flowpath ring 141, an inner flowpath ring 143, and a plurality of stator vanes 142 extending between the outer flowpath ring 141 and inner flowpath ring 143. Stator vanes 142 may be spaced about the circumference of outer flowpath ring 141 and inner flowpath ring 143. Stator segments 140 may be referred to as a banded stator segment, as the stator vane 142 and fluid flow may be banded between outer flowpath ring 141 and inner flowpath ring 143. Each stator segment 140 may be referred to as a stage of the compressor.

In some embodiments, stator vanes 142 are hot upset to one or both of outer flowpath ring 141 and inner flowpath ring 143. During hot upset processing, one or more tangs extending from the end of a stator vane 142 is inserted into one or more slots, respectively, of a flowpath ring. The tang is heated and then deformed to couple the stator vane 142 to the flowpath ring.

Outer flowpath ring 141 is annular and may extend axially forward or aft such that outer flowpath ring 141 is disposed radially outward from one or more adjacent rotor segments 120. Outer flowpath ring 141 may be adapted to couple with casing 131, for example through a tongue and groove, a keyway, or the use of tangs as described in greater detail below. In some embodiments outer flowpath ring 141 includes an abradable ring 146 adapted to ensure that the tip of a blade 121 does not impinge the casing 131 or the outer flowpath ring 141. Abradable ring 146 may be formed from a material which is softer or more maleable than the materials which form the casing 131 or the outer flowpath ring 141. Abradable ring 146 is radially disposed between the blade tips 127 of one of the rotor segments 120 and the casing 131.

Inner flowpath ring 143 is annular and may include a radially inward facing sealing member 145 which is adapted to engage a portion of a sealing arm 124 of a rotor segment 120. In some embodiments sealing member 145 engages a plurality of knife edges 125 extending from sealing arm 124 to form a labyrinth seal. In some embodiments sealing member 145 may be formed as an annular ring. In other embodiments, sealing member 145 comprises a coating applied to inner flowpath ring 143.

During operation, stator segments 140 remain fixed or stationary.

Rotor segments 120 and stator segments 140 are disposed inside casing 131 in alternating fashion, such that stator segments 140 are disposed between a pair of rotor segments 120. In some embodiments, such as that shown in FIG. 1C, axial compressor 100 comprises five rotor segments 120 and four stator segments 140. In other embodiments rotor segments 120 and stator segments 140 are disposed in pairs and thus an equal number of rotor segments 120 and stator segments 140 are disposed inside casing 131. Each rotor segment 120 and stator segment 140 pair may be referred to as a stage of the compressor.

A radially inner flow boundary 134 is formed by the annular surface 126 of ring 122 of rotor segment 120 and the annular surface 144 of inner flowpath ring 143 of stator segment 140. The flow boundary 134 may be interrupted by various cavities adjacent the seals between the rotor segments 120 and stator segments 140.

In some embodiments a fluid diffuser 155 is disposed in second end 133 and further defines the fluid flowpath in the axially aft direction. Diffuser 155 may comprise a sealing member 157 adapted to engage at least a portion of a sealing arm 124 of a rotor segment 120. In some embodiments sealing member 157 engages a plurality of knife edges 125 extending from sealing arm 124 to form a labyrinth seal. In some embodiments sealing member 157 may be formed as an annular ring. In other embodiments, sealing member 157 comprises a coating applied to diffuser 155. Diffuser 155 may further comprises a plurality of guide vanes.

In some embodiments the plurality of rotor segments 120 and stator segments 140 may be held in compression by a compressive element, for example a threaded bolt between first end 132 and second end 133 of casing 131.

In some embodiments spacers (not shown) may be included between one or more of the plurality of rotor segments 120 and stator segments 140.

In some embodiments one or more of the plurality of blades 121 and stator vanes 142 are fabricated using stamping, injection molding including metal injection molding, and/or composite and resin fabrication. In some embodiments blades 121 are coupled to annular ring 122 using brazing, welding, or adhesive. In some embodiments stator vanes 142 are coupled between outer flowpath ring 141 and inner flowpath ring 143 using brazing, welding, or adhesive.

With reference now to FIG. 1A, the assembly of the disclosed axial compressor will be described. FIG. 1A is a side cutaway view of a partially-assembled axial compressor 100. As shown in FIG. 1A, a diffuser segment 155 is initially installed at second end 133 of casing 131. Diffuser segment 155 may act as a backstop which prevents axially aft movement of rotor segments 120 and stator segments 140.

In some embodiments diffuser segment 155 comprises an abradable ring 159 which extends axially forward and is disposed radially outward from a rotor assembly 120.

A rotor assembly 120 is inserted into casing 131 at first end 132 and moved axially aft toward second end 133. When in position, a sealing arm 124 may extend from rotor assembly 120 and engage a sealing member 157 of diffuser segment 155.

Following the insertion and position of rotor assembly 120, as shown in FIG. 1A a stator segment 140 is inserted into casing 131 at first end 132 and moved axially aft toward second end 133. FIG. 1B is a side cutaway view of a partially-assembled axial compressor 100 and shows the stator segment 140 which was inserted in FIG. 1A in a final position. In some embodiments stator segment 140 may be positioned adjacent the axially-forward side of rotor segment 120. In some embodiments stator segment 140 may be positioned abutting the axially-forward side of rotor segment 120. As shown in FIG. 1B, stator segment 140 comprises an abradable ring 146 which extends axially forward to be disposed between a subsequently-inserted rotor portion 120 and casing 131. In some embodiments stator segment 140 may include an abradable ring 146 which extends axially aft to be disposed between the previously-inserted rotor portion 120 and casing 131.

Once the stator segment 140 is positioned as shown in FIG. 1B, additional rotor segments 120 and stator segments 140 are inserted into casing 131 at first end 132 and moved axially aft toward second end 133. Rotor segments 120 and stator segments 140 are positioned in alternating fashion.

FIG. 1C is a side cutaway view of an axial compressor 100 following the assembly process as described above with reference to FIGS. 1A and 1B.

Figure 2:
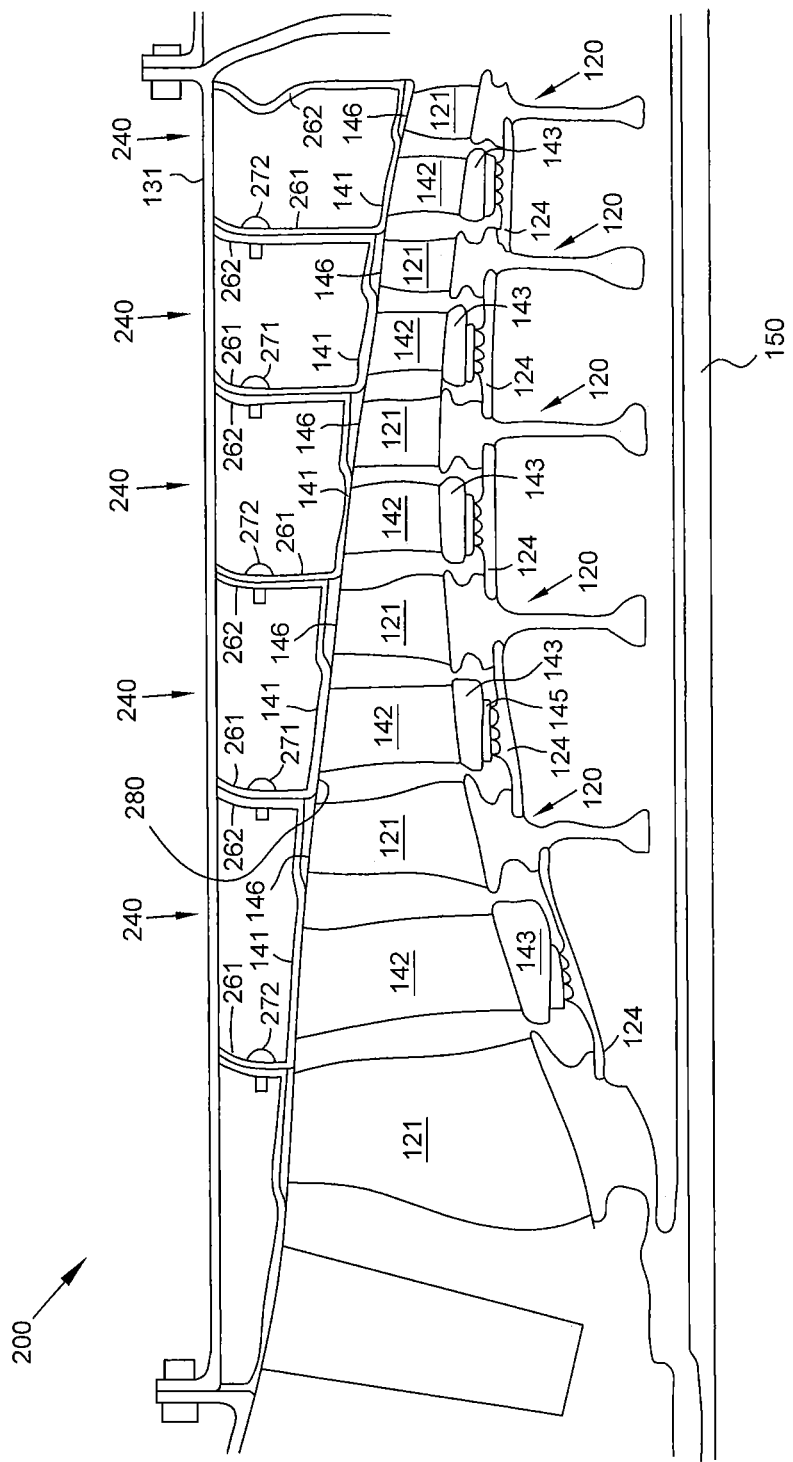
FIG. 2 is a side cutaway view of an axial compressor in accordance with some embodiments of the present disclosure.

FIG. 2 is a side cutaway view of an axial compressor 200 in accordance with some embodiments of the present disclosure. Axial compressor 200 comprises a plurality of rotor segments 120 and stator segments 240 disposed inside a compressor casing 131. Rotor segments 120 are coupled to rotatable shaft 150.

Stator segments 240 comprise an outer flowpath ring 141, an inner flowpath ring 143, and a plurality of stator vanes 142 extending between the outer flowpath ring 141 and inner flowpath ring 143. Stator vanes 142 may be spaced about the circumference of outer flowpath ring 141 and inner flowpath ring 143.

Stator segments 240 further comprise a pair of opposing tangs 261, 262 extending radially outward from the outer flowpath ring 141 in order to space the outer flowpath ring 141 radially inward from the casing 131. Tangs 261 and 262 have curved ends which are configured to engage casing 131 and assist in maintaining the position, once assembled, of stator segments 240. In some embodiments adjacent stator segments 240 may be coupled using one or more fasteners 271, 272. In some embodiments fasteners 271 and 272 may be used to fasten adjacent or abutting tangs 261, 262. In some embodiments fasteners 271 and 272 comprise pins which prevent rotation of stator segments 140 during operation.

Outer flowpath ring 141 is annular and may extend axially forward or aft such that outer flowpath ring 141 is disposed radially outward from one or more adjacent rotor segments 120. In some embodiments outer flowpath ring 141 includes an abradable ring 146 adapted to ensure that the tip of a blade 121 does not impinge the casing 131 or the outer flowpath ring 141. Abradable ring 146 may be formed from a material which is softer or more maleable than the materials which form the casing 131 or the outer flowpath ring 141. Abradable ring 146 is radially disposed between the blade tips 127 of one of the rotor segments 120 and the casing 131.

An outer flow boundary 280 is formed by the radially inner surfaces of each stator segment 240.

Figure 3:
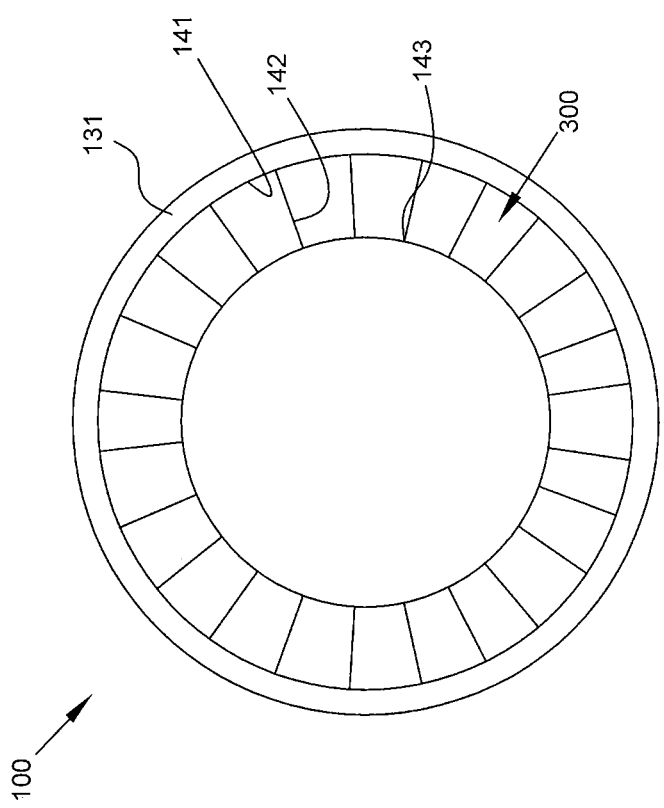
FIG. 3 is an axial profile view of an axial compressor in accordance with some embodiments of the present disclosure.

FIG. 3 is an axial profile view of an axial compressor 100 viewed from an axially forward position and looking in an axially aft direction. The axial cross-section shown in FIG. 3 is taken at a stator segment 140. Compressor 100 is defined in the radially outward direction by casing 131. A fluid flowpath 300 is partially bounded in a radially outward dimension by the radially inner surface of outer flowpath ring 141 and is partially bounded in a radially inward dimension by the radially outer surface of inner flowpath ring 143. A plurality of stator vanes are disposed circumferentially about and between the outer flowpath ring 141 and inner flowpath ring 143.

The disclosed axial compressor as described above has numerous and varied applications in the field of fluid compression. Such applications include, but are not limited to, aviation applications such as gas turbine engines for aircraft and unmanned aerial vehicles (UAVs), expendable compressor applications such as for missile propulsion systems, land- and sea-based gas turbine engines providing electrical generation and/or propulsion, and any rotating machinery generally.

The present disclosure provides many advantages over previous axial compressors. In particular, significant cost savings may be achieved by simplicity of design; reduction or elimination of numerous fasteners, discs, and seal assemblies currently required in advanced compressor designs; ease of manufacture and assembly; and substitution of less expensive composite materials for metal and metal-based materials.

Figure 4A:
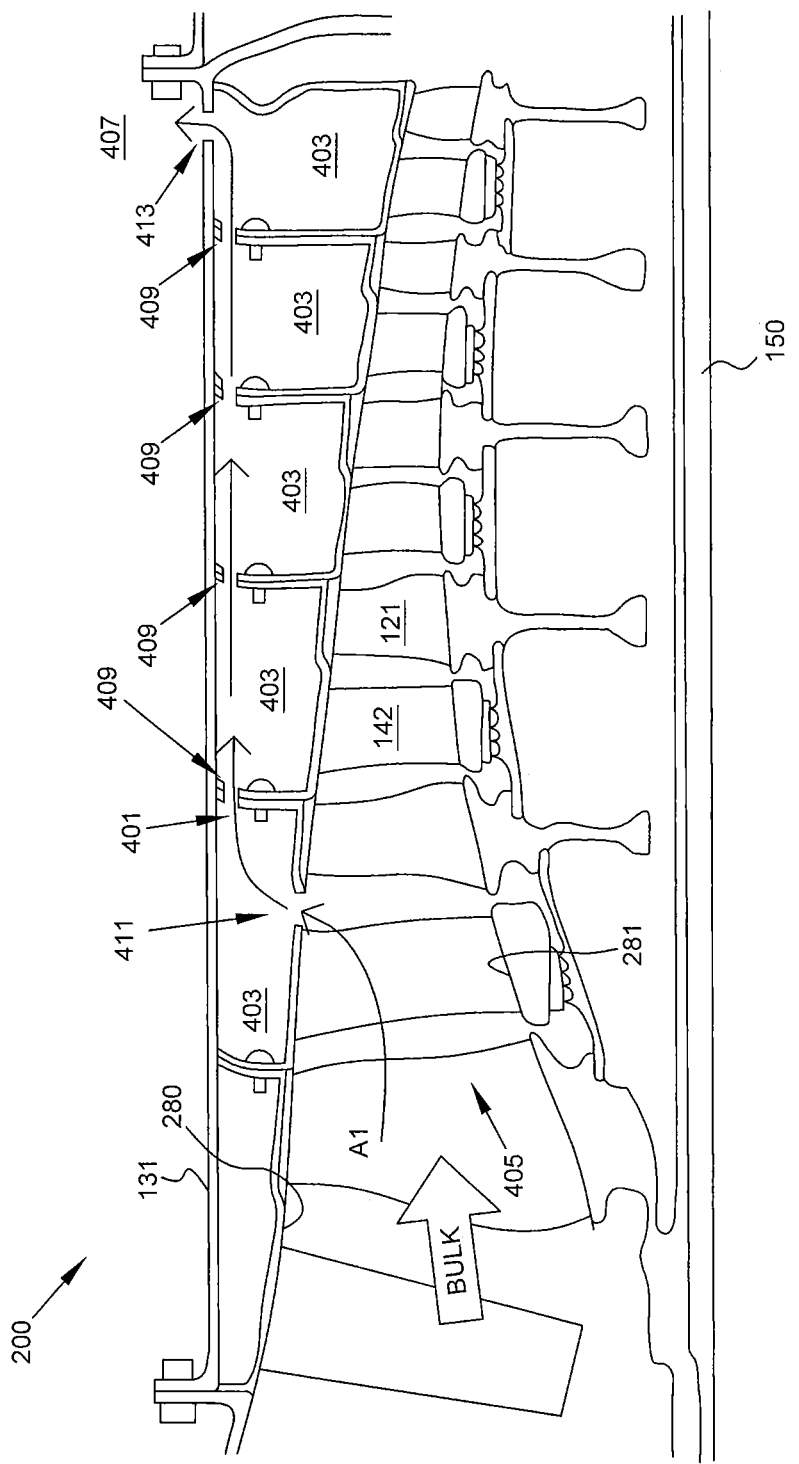
FIG. 4A is a side cutaway view of an axial compressor with a cooling pathway in accordance with some embodiments of the present disclosure.
Figure 4B:
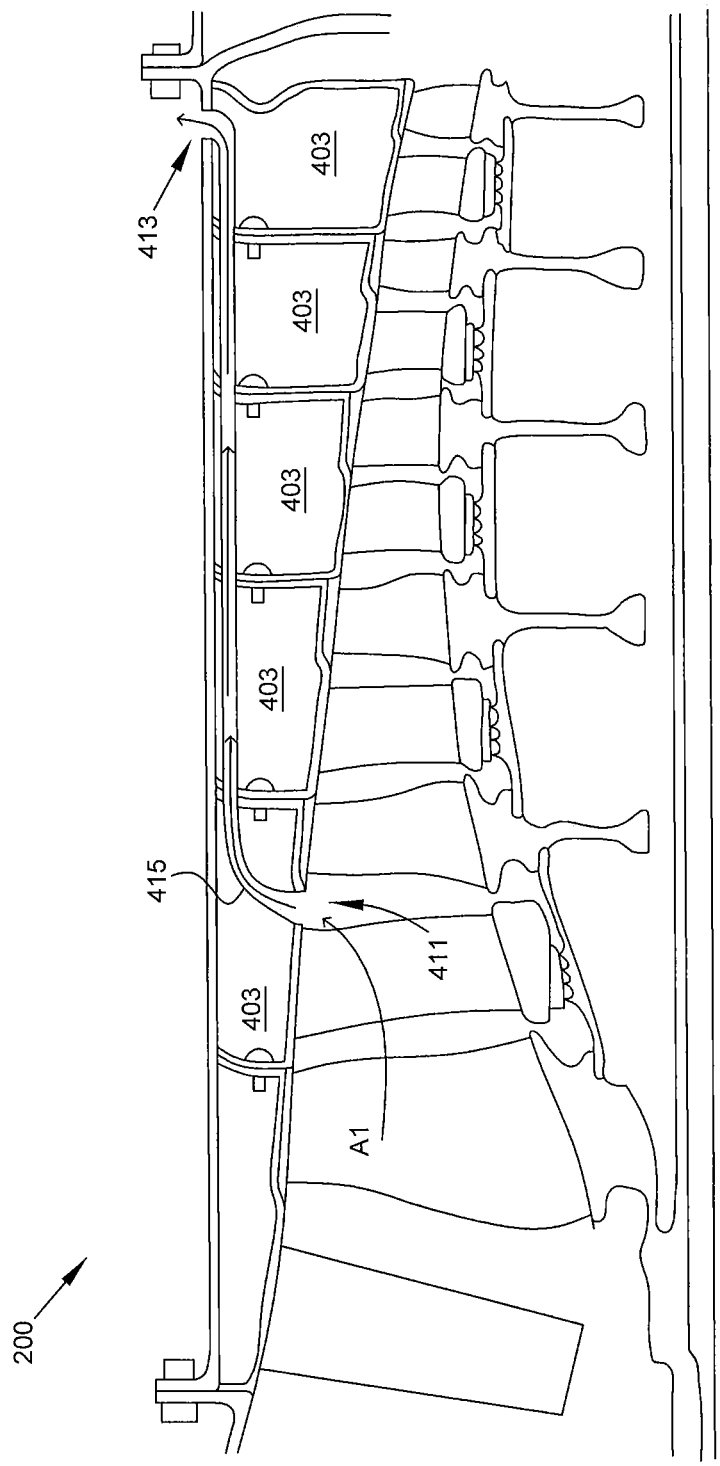
FIG. 4B is a side cutaway view of an axial compressor with a cooling pathway in accordance with some embodiments of the present disclosure.

According to further aspects of the present disclosure, systems and methods are provided of cooling the axial compressor 200 described above. FIGS. 4A and 4B are side cutaway views of an axial compressor 200 with a cooling pathway 401 in accordance with some embodiments of the present disclosure.

As discussed above, axial compressor 200 comprises a plurality of stator segments 240 and rotor segments 120 which are positioned axially adjacent to each other in alternating fashion within a casing 131. Each stator segment 240 comprises an inner flowpath ring 143, an outer flowpath ring 141, and a plurality of stator vanes 142. The vanes 142 extend between and are positioned about the circumference of the inner flowpath ring 143 and outer flowpath ring 141. In some embodiments one or more stator segments 240 has vanes 142 that are variable pitch vanes capable of actuating to adjust their angle relative to the direction of bulk flow.

A pair of tangs 261, 262 extend from and engage the outer flowpath ring 141 to the casing 131. Together the outer flowpath ring 141, tangs 261, 262, and casing 131 form an annulus 403 of each stator segment 240. Tangs 261, 262 therefore space the outer flowpath ring 141 from the casing 131 and form the annulus 403 between the outer flowpath ring 141 and casing 131.

Each rotor segment comprises a bladed disc 120 configured to be coupled to a rotating shaft 150.

An outer flow boundary 280 is formed by the radially inner surfaces of each stator segment 240. An inner flow boundary 281 is formed by inner flow ring 143 of rotor segment 120 and sealing arms 124 extending between rotor segments 120 and stator segments 240. A main or bulk flowpath 405 of the compressor 200 is defined between the outer flow boundary 280 and the inner flow boundary 281 of the compressor. Air flow in the bulk flowpath 405 is indicated with the arrow labeled "Bulk."

A pathway 401 is provided at least between the annuli 403 of any two adjacent stator segments 240. Air flow through pathway 401 is illustrated as arrow A1. In some embodiments, such as that illustrated in FIG. 4A, a pathway 401 is provided between the bulk flowpath 405 and ambient air 407 located radially outward of the casing 131. Pathway 401 may be defined as one or more apertures 409 in the tangs 261, 262 of adjacent stator segments 240. In the embodiment shown in FIG. 4A, an entry pathway comprises an aperture 411 permitting air flow between the bulk flowpath 405 and an annulus 403 of a stator segment 240. Additional apertures 409 permit air flow to adjacent annuli 403. An exit pathway comprises an aperture 413 permitting air flow between an annulus 403 of a stator segment 240 and ambient air 407. Exit pathway 413 is positioned axially downstream of the entry pathway 411.

In operation, air pressure proximate the entry pathway 411 is greater than air pressure proximate the exit pathway 413 because air proximate the entry pathway 411 has passed through at least a first stage of the compressor 200. Air flow is thus induced from the relatively higher pressure proximate the entry pathway 411 to the relatively lower pressure of ambient air 407 proximate the exit pathway 413. The induced air flow through pathway 401 provides cooling of each annulus 403 of a stator segment 240, and thus provides cooling to later stages of the compressor 200 as heat generated in later stages is transferred from the bulk flowpath 405 to the annulus 403 and then out to ambient via cooling air flow.

During manufacture of the axial compressor 200, rotor segments 120 and stator segments 240 are alternately installed in the casing 131. Rotor segments 120 are secured to the rotatable shaft 150, and stator segments 240 are secured inside the casing 131 via tangs 261, 262 which are configured to friction fit into the casing. In some embodiments additional fasteners or adhesive may be applied to the tang-casing interface. Each rotor segment 120—stator segment 240 pair comprises a stage of the compressor 200.

In some embodiments a plurality of apertures 409 are provided in each tang 261, 262 and spaced circumferentially and/or radially about the tang 261, 262. It is therefore important during assembly of the compressor 200 to ensure that apertures 409 of a first stator segment 240 are aligned with apertures 409 of axially adjacent stator segments 240 to ensure the formation of a pathway 401.

A method of cooling axial compressor 200 comprises providing an axial compressor 200 as substantially described above, specifically as having stator segments 240 defining an annulus 403 such that the outer flowpath ring 141 is radially inwardly spaced from casing 131. The provided compressor 200 further comprises a pathway 401 between adjacent annuli 403, and in some embodiments comprises a pathway 401 from the bulk flowpath 405 to ambient air 407 via at least two annuli 403. The method further comprises introducing air flow, typically through operation of the compressor 200 which creates a differential pressure across the pathway 401, such that relatively cooler air flows through the pathway 401 and removes heat from later stages of the compressor 200.

In another embodiment, shown in FIG. 4B, pathway 401 is defined by a tube 415 passing from the entry pathway 411 to the exit pathway 413. Tube 415 may be advantageously provided to reduce or eliminate turbulent flow through each annulus 403 of a stator segment 240. The flow of relatively cooler air through a tube 415 proximate the casing 131 may also create a thermal gradient across the annulus 403, with relatively warmer air proximate the outer flow ring 141. The use of tube 415 additionally allows for multiple discrete flowpaths through the annulus 403, for example by allowing both cooling airflow and air injection airflow or by allowing multiple cooling flowpaths.

Figure 6:
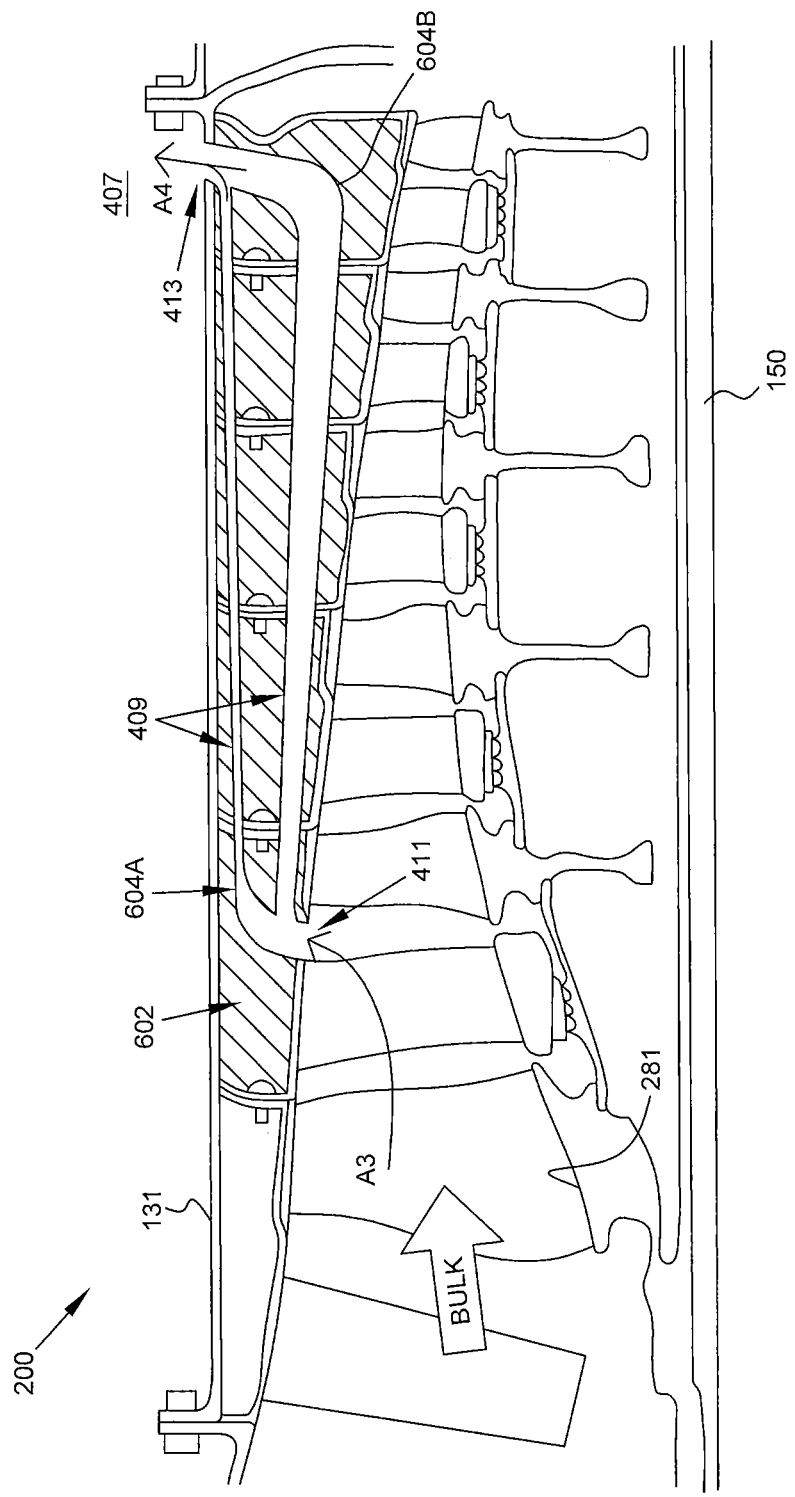
FIG. 6 is a side cutaway view of an axial compressor with one or more cooling pathways through a material having high thermal conductivity in accordance with some embodiments of the present disclosure.

FIG. 6 presents a side cutaway view of an axial compressor 200 with one or more cooling pathways through a material having high thermal conductivity in accordance with some embodiments of the present disclosure. In the embodiment illustrated in FIG. 6, one or more annuli 403 of the compressor 200 are substantially filled with a filler 602 that defines one or more pathways 604A, 604B.

In some embodiments filler 602 is formed from a high thermally conductive material 602. For example, filler 602 may be formed from a metallic foam material such as an aluminum-, copper-, silver-, or graphite-based foam. For example, in some embodiments filler 602 may be made from POCOFoam®. In other embodiments other materials having a high thermal conductivity will be utilized to make filler 602. In some embodiments a material having a high radial thermal conductivity but a low axial thermal conductivity will be utilized as filler 602.

One or more pathways 604A, 604B are provided at least between the annuli 403 of any two adjacent stator segments 240. Air flow entering pathways 604A, 604B is illustrated as arrow A3, while air flow exiting pathways 604A, 604B is illustrated as arrow A4. In some embodiments such as that illustrated in FIG. 6, pathways 604A, 604B are provided between the bulk flowpath 405 and ambient air 407 located radially outward of the casing 131. Pathways 604A, 604B may be defined by filler 602 as well as one or more apertures 409 in the tangs 261, 262 of adjacent stator segments 240. In the embodiment shown in FIG. 6, an entry pathway comprises an aperture 411 permitting air flow between the bulk flowpath 405 and the one or more pathways 604A, 604B defined by filler 602 of an annulus 403 of a stator segment 240. Additional apertures 409 permit air flow to adjacent annuli 403. An exit pathway comprises an aperture 413 permitting air flow between an annulus 403 of a stator segment 240 and ambient air 407. Exit pathway 413 is positioned axially downstream of the entry pathway 411.

In operation, air pressure proximate the entry pathway 411 is greater than air pressure proximate the exit pathway 413 because air proximate the entry pathway 411 has passed through at least a first stage of the compressor 200. Air flow is thus induced from the relatively higher pressure proximate the entry pathway 411 to the relatively lower pressure of ambient air 407 proximate the exit pathway 413. The induced air flow through pathways 604A, 604B provides cooling of each annulus 403 of a stator segment 240, and thus provides cooling to later stages of the compressor 200 as heat generated in later stages is transferred from the bulk flowpath 405 to the annulus 403 and then out to ambient air 407 via cooling air flow. Filler 602, having a high thermal conductivity, improves the efficiency of this heat transfer from the bulk flowpath 405 to the annulus 403 and on to the ambient air 407.

In some embodiments a plurality of apertures 409 are provided in each tang 261, 262 and spaced circumferentially and/or radially about the tang 261, 262. For example, in the embodiment illustrated in FIG. 6 several stator segments 240 have a first pathway 604A and a second pathway 604B which are radially spaced from each other. It is therefore important during assembly of the compressor 200 to ensure that the apertures 409 and pathways 604A, 604B defined by filler 602 of a first stator segment 240 are aligned with apertures 409 and pathways 604A, 604B of axially adjacent stator segments 240 to ensure the formation of pathways 604A, 604B that are in fluid communication from one stator segment 240 to the next.

A method of cooling axial compressor 200 comprises providing an axial compressor 200 as substantially described above with reference to FIG. 6, specifically as having stator segments 240 defining an annulus 403 such that the outer flowpath ring 141 is radially inwardly spaced from casing 131. One or more annuli 403 of the compressor 200 are substantially filled with a filler 602 having a high thermal conductivity. The provided compressor 200 further comprises one or more pathways 604A, 604B between adjacent annuli 403, and in some embodiments comprises one or more pathways 604A, 604B from the bulk flowpath 405 to ambient air 407 via at least two annuli 403. The method further comprises introducing air flow, typically through operation of the compressor 200 which creates a differential pressure across the pathways 604A, 604B, such that relatively cooler air flows through the pathways 604A, 604B and removes heat from later stages of the compressor 200.

The embodiments of FIGS. 4A, 4B, and 6 advantageously remove heat from compressor 200, which allow for the use of certain materials such as composite materials in the manufacture of the compressor 200.

Figure 8A:
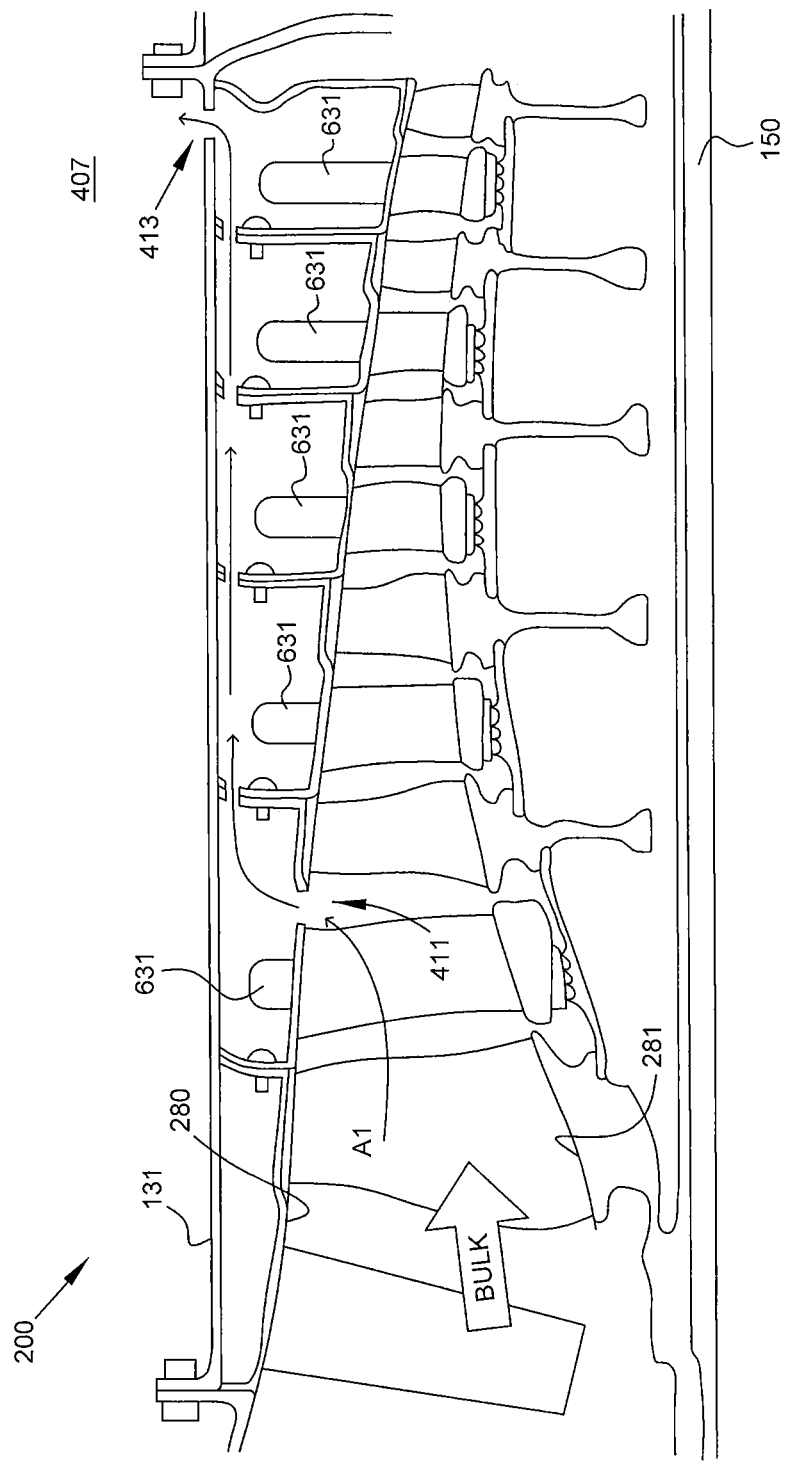
FIG. 8A is a side cutaway view of an axial compressor configured for intercooling in accordance with some embodiments of the present disclosure.
Figure 8B:
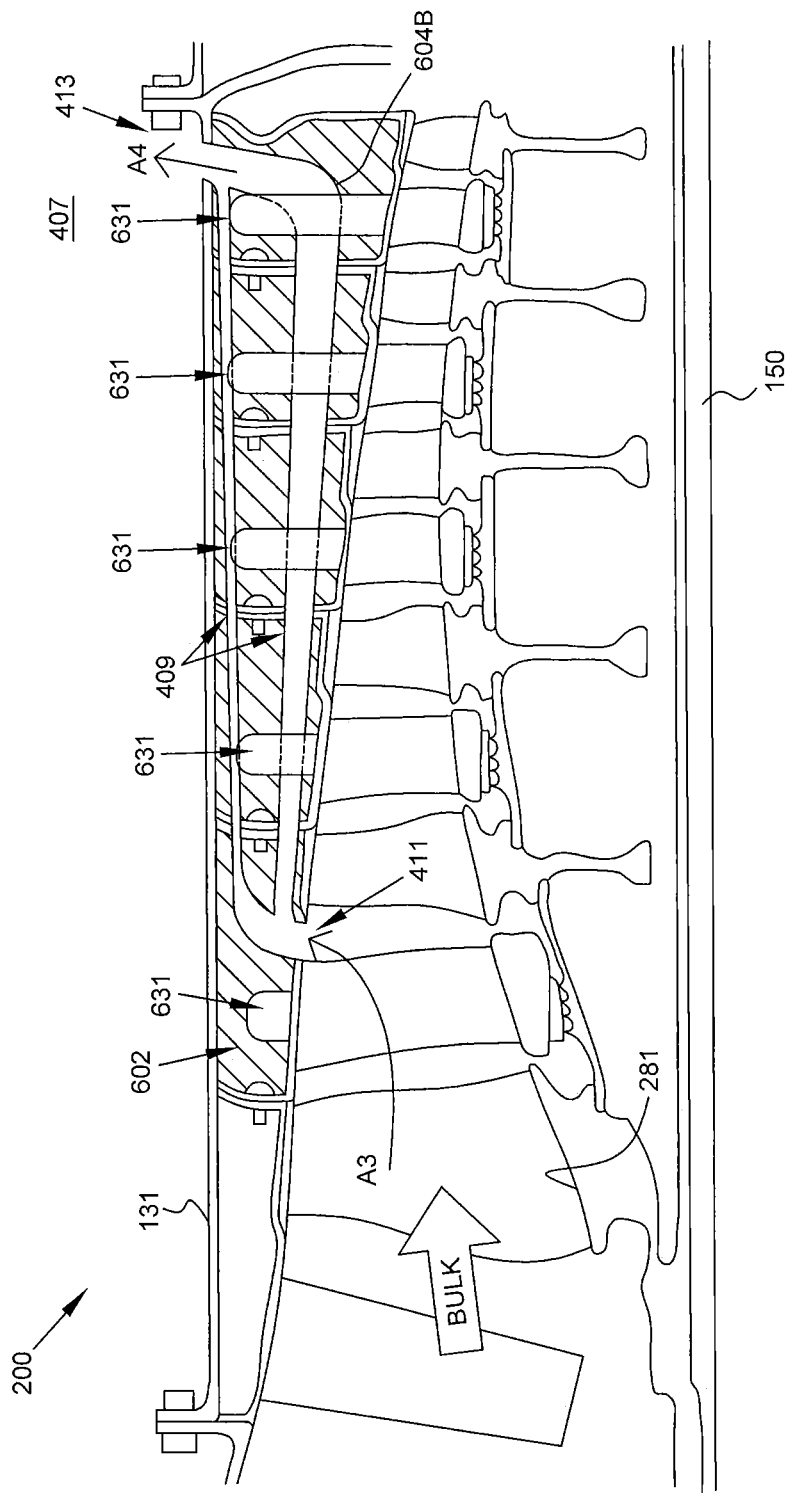
FIG. 8B is a side cutaway view of an axial compressor configured for intercooling in accordance with some embodiments of the present disclosure.

The present disclosure additional provides systems and methods of intercooling an axial compressor. Intercooling improves the efficiency of a compressor by extracting heat between compressor stages. Removing heat reduces the volume of fluid to be compressed, thus saving work. FIGS. 8A and 8B present a side cutaway views of an axial compressor configured for intercooling in accordance with some embodiments of the present disclosure.

In the embodiments of FIGS. 8A and 8B, portions of one or more stator vanes 142 extend through and radially outward beyond the respective outer flowpath ring 141. These portions are labeled as extending members 631. Each extending member 631 passes through a corresponding aperture (not shown) of the outer flowpath ring 141 and into the annulus 403. Each annulus 403 may be substantially open as illustrated in FIG. 8A and described above, for example, with reference to FIG. 4A, or may be substantially filled as illustrated in FIG. 8B and described above, for example, with reference to FIG. 6. In embodiments having a substantially filled annulus 403, one or more extending members 631 may extend into filler 602.

Extending members 631 provide compressor intercooling by assisting with the radially outward transfer of heat at each stage of the compressor. As stator vanes 142 heat up during operation of the compressor 200, heat is transferred radially outward from vane 142 to extending member 631. Extending member 631 extends into the annulus 403, filler 602, and/or pathways 604A, 604B. The introduction of cooling air flow through the annuli 403 and/or pathways 604A, 604B results in the flow of cooling air across or around one or more of the extending members 631. Heat transferred to the cooling air flow is then transferred to ambient air 407.

Figure 5A:
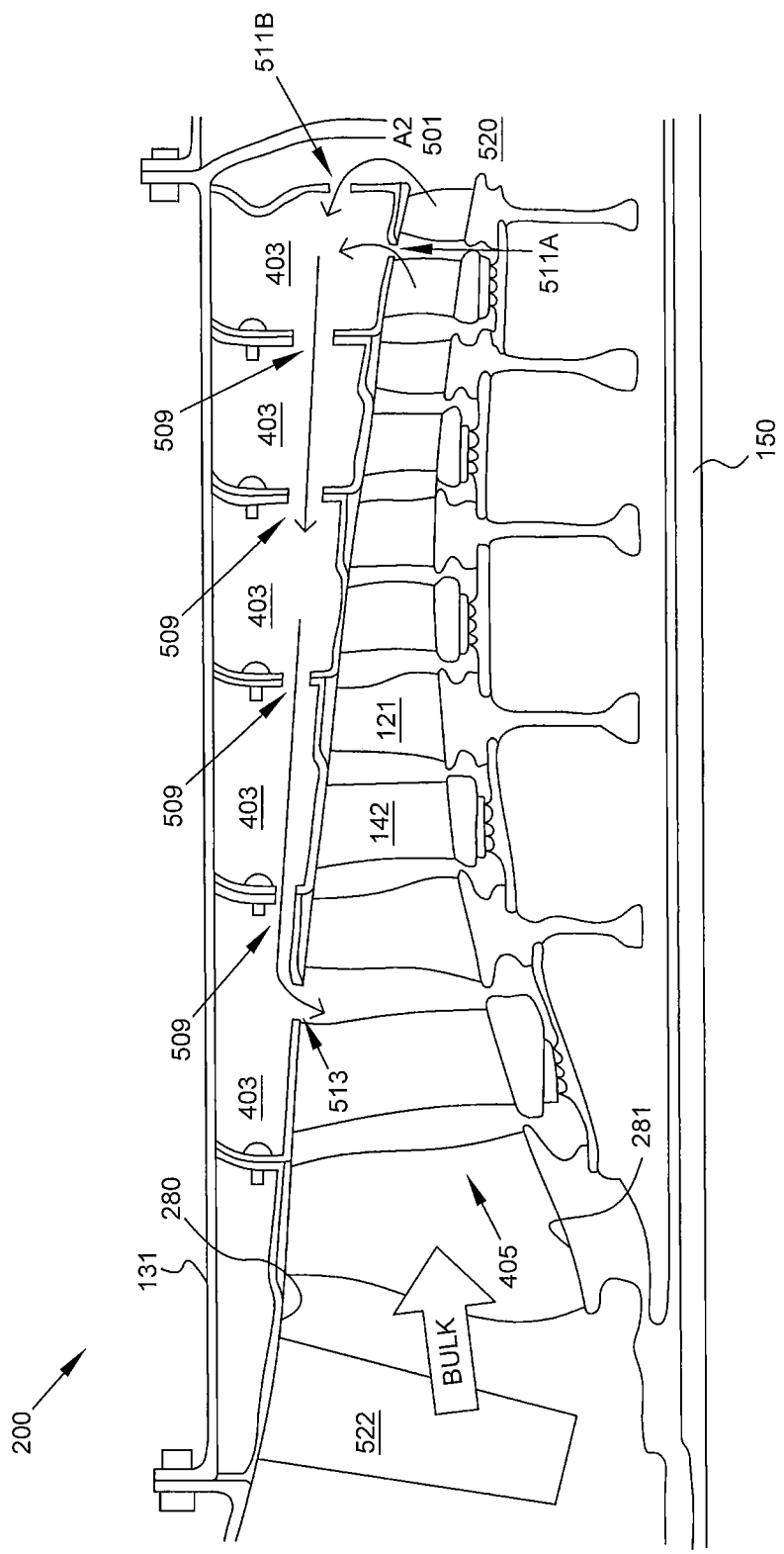
FIG. 5A is a side cutaway view of an axial compressor with an air injection pathway in accordance with some embodiments of the present disclosure.
Figure 5B:
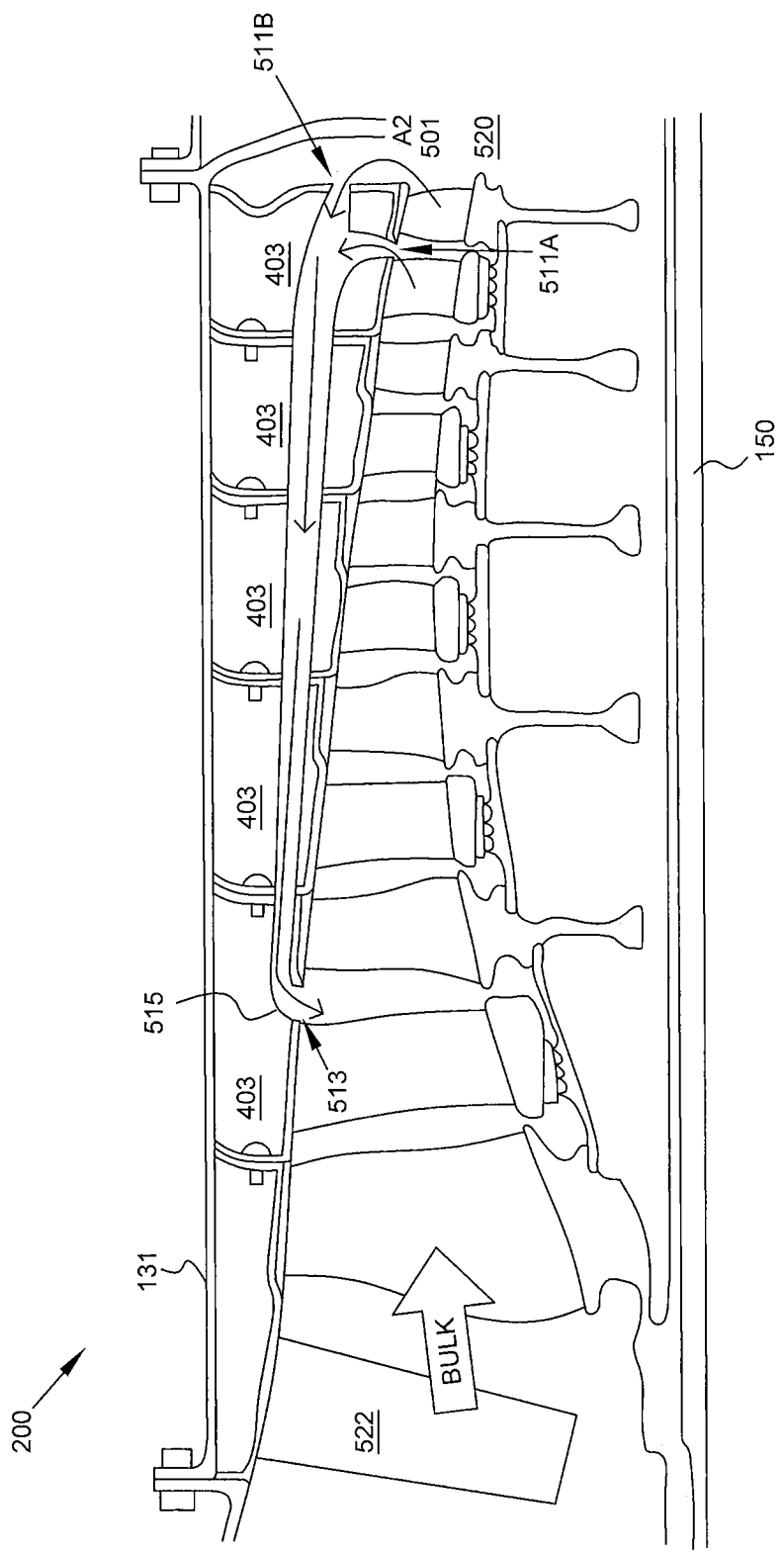
FIG. 5B is a side cutaway view of an axial compressor with an air injection pathway in accordance with some embodiments of the present disclosure.
Figure 9:
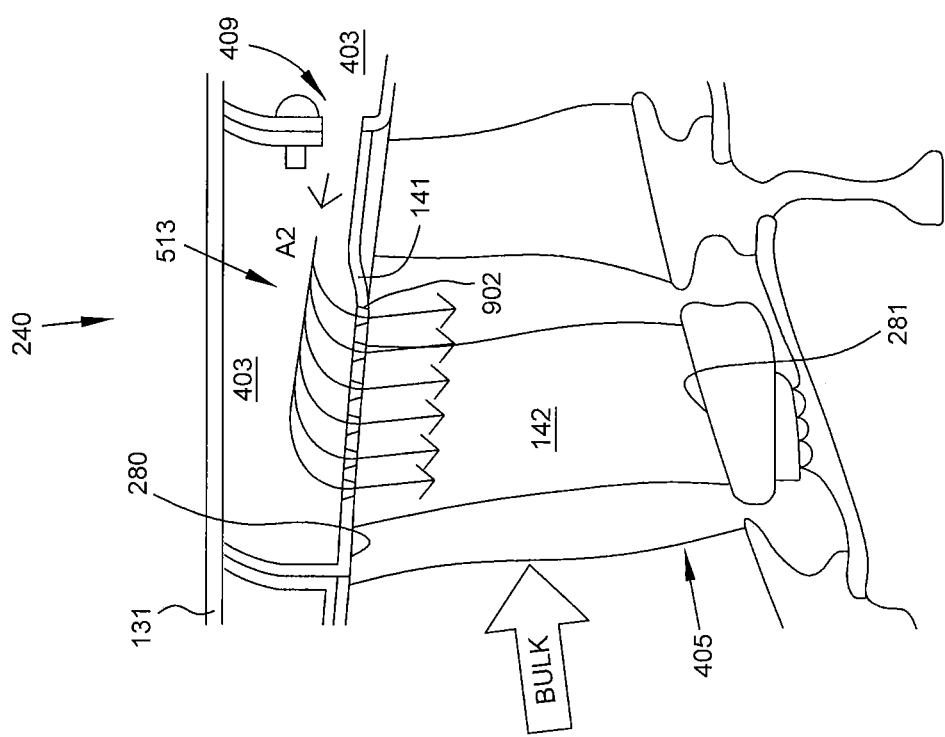
FIG. 9 is a detailed side cutaway view of a stator segment in an axial compressor in accordance with some embodiments of the present disclosure.
Figure 10:
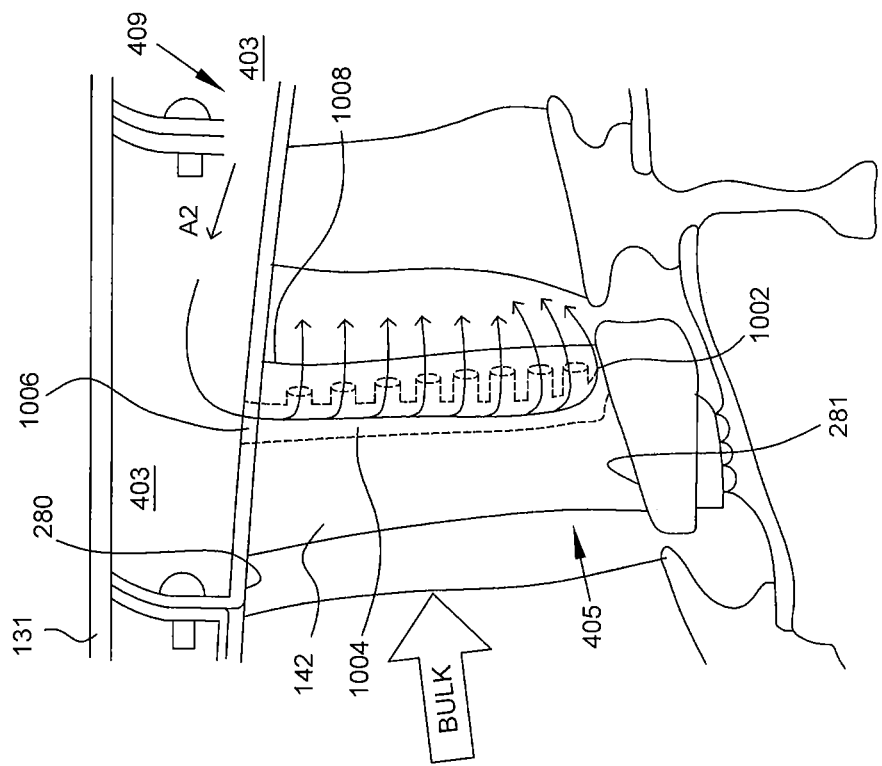
FIG. 10 is a detailed side cutaway view of a stator segment in an axial compressor in accordance with some embodiments of the present disclosure.

The present disclosure further provides systems and methods for improving the efficiency of compressor 200 described above through the injection of relatively higher pressure air into earlier stages of the compressor 200, which may be referred to as air injection. Injection of high pressure air at early stages of the compressor 200 increases the energy of air flowing through the bulk flowpath 408 and causes disruptions in any boundary layer that may form proximate the outer flow boundary 280 and/or the inner flow boundary 281 of the compressor 200. Reduction or elimination of a boundary layer improves compressor efficiency. FIGS. 5A and 5B are side cutaway views of an axial compressor 200 with an air injection pathway 501 in accordance with some embodiments of the present disclosure. FIGS. 9 and 10 are detailed side cutaway views of a stator segment in an axial compressor in accordance with some embodiments of the present disclosure.

Pathway 501 is provided at least between the annuli 403 of any two adjacent stator segments 240. Air flow through pathway 501 is illustrated as arrow A2. In some embodiments, such as that illustrated in FIG. 5A, a pathway 501 is provided between the bulk flowpath 405 at a point proximate the compressor discharge 520 and the bulk flowpath 405 at a point proximate the compressor inlet 522. In other words, pathway 501 provides an air flowpath from relatively later stages to relatively earlier stages of the compressor 200.

Pathway 501 may be defined as one or more apertures 509 in the tangs 261, 262 of adjacent stator segments 240. In the embodiment shown in FIG. 5A, one or more entry pathways 511A, 511B are provided, with each entry pathway 511A, 511B comprising an aperture 511 permitting air flow between the bulk flowpath 405 proximate the compressor discharge 520 and an annulus 403 of a stator segment 240. In some embodiments only one of entry pathways 511A and 511B are provided in the compressor 200. In other embodiments, both entry pathways 511A and 511B are provided in the compressor 200.

Additional apertures 509 permit air flow to adjacent annuli 403. An exit pathway comprises an aperture 513 permitting air flow between an annulus 403 of a stator segment 240 and the bulk flowpath 405 proximate the compressor inlet 522. Exit pathway 513 is positioned axially upstream of the one or more entry pathways 511A, 511B.

In some embodiments exit pathway 513 comprises a plurality of nozzles 902 defined by and passing through the outer flowpath ring 141. FIG. 9 is a depiction of such an embodiment. Air flow A2 passes through aperture 409 to cross from one annulus 403 to an adjacent annulus 403. Air flow A2 then passes through one or more nozzles 902 to cross from annulus 403 to the bulk flowpath 405. Upon entering the bulk flowpath 405, the high energy air flow A2 disrupts the formation or continuation of an boundary layer proximate the outer flow boundary 280 and/or the inner flow boundary 281 of the compressor 200. Based on the location of nozzles 902 in the outer flowpath ring 141, the embodiment of FIG. 9 would likely be more effective at preventing or reducing the boundary layer proximate the outer flow boundary 280.

In some embodiments exit pathway 513 comprises a plurality of nozzles or apertures 1002 defined by and passing through stator vane 142. FIG. 10 is a depiction of such an embodiment. A pathway 1004 is defined interior to the stator vane 142. Pathway 1004 is in fluid communication with a respective annulus 403 via an aperture 1006. Nozzles 1002 may be positioned proximate the trailing edge 1008 of stator vane 142. In the illustrated embodiment, nozzles 1002 are configured as a single row of nozzles 1002 oriented substantially parallel to trailing edge 1008. However, additional nozzle configurations are contemplated, such as multiple rows, nozzle groupings, and alternative placements along the stator vane 142.

Air flow A2 passes through aperture 409 to cross from one annulus 403 to an adjacent annulus 403. Air flow A2 then passes through aperture 1006 and into pathway 1004. From there, air flow A2 passes through one or more nozzles 1002 to cross from annulus 403 to the bulk flowpath 405. Upon entering the bulk flowpath 405, the high energy air flow A2 disrupts the formation or continuation of an boundary layer proximate the outer flow boundary 280 and/or the inner flow boundary 281 of the compressor 200.

In operation, air pressure proximate the entry pathways 511A, 511B is greater than air pressure proximate the exit pathway 513 because air proximate the entry pathways 511A, 511B has passed through most stages of the compressor 200, while air flow proximate the exit pathway 513 has passed through relatively fewer stages of the compressor 200. Air flow is thus induced from the relatively higher pressure proximate the entry pathways 511A, 511B to the relatively lower pressure proximate the exit pathway 513. The induced air flow through pathway 501 increases the air pressure in earlier stages of the compressor 200, and thus improves the efficiency of the compressor through disruption, reduction, and/or prevention of a boundary layer proximate the outer flow boundary 280 and/or the inner flow boundary 281.

In some embodiments a plurality of apertures 509 are provided in each tang 261, 262 and spaced circumferentially and/or radially about the tang 261, 262. It is therefore important during assembly of the compressor 200 to ensure that apertures 509 of a first stator segment 240 are aligned with apertures 509 of axially adjacent stator segments 240 to ensure the formation of a pathway 501.

A method of improving the efficiency of axial compressor 200 comprises providing an axial compressor 200 as substantially described above, specifically as having stator segments 240 defining an annulus 403 such that the outer flowpath ring 141 is radially inwardly spaced from casing 131. The provided compressor 200 further comprises a pathway 501 between adjacent annuli 403, and in some embodiments comprises a pathway 501 from the bulk flowpath 405 proximate the compressor discharge 520 to the bulk flowpath 405 proximate the compressor inlet 522 via at least two annuli 403. The method further comprises introducing air flow, typically through operation of the compressor 200 which creates a differential pressure across the pathway 501, such that relatively higher pressure air flows through the pathway 501 and increases air pressure in a relatively earlier compressor stage.

In another embodiment, shown in FIG. 5B, pathway 501 is defined by a tube 515 passing from the entry pathway 511 to the exit pathway 513. Tube 515 may be advantageously provided to reduce or eliminate turbulent flow through each annulus 403 of a stator segment 240. The use of tube 515 additionally allows for multiple discrete flowpaths through the annulus 403, for example by allowing both cooling airflow and air injection airflow or by allowing multiple cooling flowpaths.

In some embodiments, the pathways 401 and 501 are each provided in the same compressor 200, allowing cooling airflow to pass through tubes 415 in an axially forward-to-aft direction while simultaneously allowing air injection to pass through tubes 515 in an axially aft-to-forward direction. Tubes 415 and 515 are spaced apart about the circumference of each stator segment 240.

Figure 7:
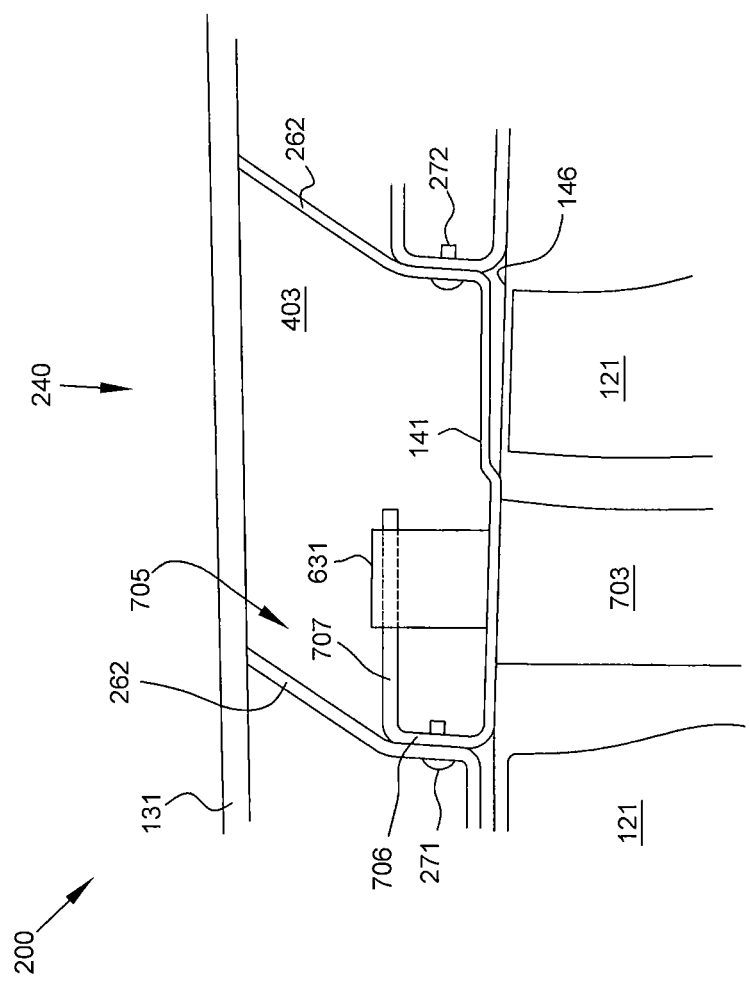
FIG. 7 is a side cutaway view of an overhung banded stator vane in accordance with some embodiments of the present disclosure.

FIG. 7 is a side cutaway view of a stator vane configuration in accordance with some embodiments of the present disclosure. In any of the above embodiments, the stator vane 142 of a stator segment 240 may be an overhung banded stator vane 702 such as that illustrated in FIG. 7. Vane 702 comprises a bulk flow portion 703 and an extending member 631. Bulk flow portion 703 extends between outer flowpath ring 141 and inner flowpath ring 143. Extending member 631 passes through the outer flowpath ring 141 and into the annulus 403.

A tang 262 extends from the outer flowpath ring 141 to casing 131 as described above. At an opposite axial end of the outer flowpath ring 141 of the stator segment 240, a rolled outer band 705 extends radially outward from the outer flowpath ring 141 for a first portion 706 and then axially for a second portion 707. The axially extending second portion 707 is coupled to extending member 631 of the stator vane 142. In some embodiments, outer flowpath ring 141 and first and second portions 706, 707 of rolled outer band 705 are formed as a unitary member. In some embodiments tang 262, outer flowpath ring 141, and first and second portions 706, 707 of rolled outer band 705 are formed as a unitary member.

The overhung banded stator 702 disclosed in FIG. 7 advantageously provides additional axial, radial, and circumferential support to the stator vane 142 of the stator segment 240.

Although examples are illustrated and described herein, embodiments are nevertheless not limited to the details shown, since various modifications and structural changes may be made therein by those of ordinary skill within the scope and range of equivalents of the claims.

What is claimed is:

1. An axial compressor comprising:
a plurality of compressor stages; and
a casing configured to encase said plurality of compressor stages positioned axially adjacent within said casing;
wherein each of said plurality of compressor stages comprises:
a rotor segment comprising a bladed disc configured to be coupled to a rotatable shaft;
a banded stator segment positioned axially adjacent said rotor segment, said stator segment comprising an outer flowpath ring, an inner flowpath ring, and a plurality of vanes extending between said rings and being spaced around the circumferences thereof, said stator segment further comprising one or more tangs extending radially outward from said outer flowpath ring to engage said casing and thereby space said outer flowpath ring radially inward from said casing forming an annulus between said casing and said outer flowpath ring; and
a pathway providing an air flowpath between said annulus and the annulus formed by an adjacent stage,
the axial compressor further comprising an entry pathway in a first of said stages providing an air flowpath between the main flowpath of said compressor stage and the annulus of said stage; and
an exit pathway in a second of said stages positioned axially downstream of said first stage, said exit pathway providing an air flowpath between the annulus of said stage and the exterior of said casing.

2. The axial compressor of claim 1, wherein a pathway in at least one of said stages comprises an aperture formed in said one or more tangs.

3. The axial compressor of claim 1, where said second stage is the final downstream stage of said compressor.

4. The axial compressor of claim 1, where said first stage is one of the first or second axially upstream stages of the compressor.

5. The axial compressor of claim 1, wherein the stator segment most proximate said entry pathway comprises a plurality of actuating stator vanes.

6. The axial compressor of claim 1, wherein said pathway is defined by a tube extending between said entry pathway and said exit pathway.

7. The axial compressor of claim 1, wherein air flow through said pathway is induced by a differential pressure between the air pressure proximate the entry pathway and the air pressure proximate the exit pathway, and wherein said differential pressure is caused by operation of said axial compressor.

8. The axial compressor of claim 1, wherein said annulus is bounded by said casing, said tangs, and said outer flowpath ring.

9. An axial compressor comprising:
a plurality of compressor stages;
a casing configured to encase said plurality of compressor stages positioned axially adjacent within said casing, wherein each of said plurality of compressor stages comprises:
  a rotor segment comprising a bladed disc configured to be coupled to a rotatable shaft;
  a banded stator segment positioned axially adjacent said rotor segment, said stator segment comprising an outer flowpath ring, an inner flowpath ring, and a plurality of vanes extending between said rings and being spaced around the circumferences thereof, said stator segment further comprising one or more tangs extending radially outward from said outer flowpath ring to engage said casing and thereby space said outer flowpath ring radially inward from said casing forming an annulus between said casing and said outer flowpath ring; and
a pathway providing an air flowpath between an entry aperture and an exit aperture, said entry aperture disposed in a first of said compressor stages and providing an air flowpath between the bulk flowpath of said compressor stage and the annulus of said stage and said exit aperture disposed in a second of said stages positioned axially downstream of said first stage, said exit aperture providing an air flowpath between the annulus of said stage and the exterior of said casing, wherein said entry aperture and said exit aperture are in fluid communication.

10. The axial compressor of claim 9, wherein said annulus of one or more of said stator segments is substantially filled with a filler.

11. The axial compressor of claim 10, wherein said filler at least partially defines said pathway.

12. The axial compressor of claim 11, wherein said filler comprises a metallic foam.

13. The axial compressor of claim 12, wherein said filler has a higher thermal conductivity in the radial direction than in the axial direction.

14. The axial compressor of claim 11, wherein a plurality of pathways are defined by said filler between said entry aperture and said exit aperture.

15. The axial compressor of claim 9, wherein said pathway in at least one of said stages comprises an aperture formed in said one or more tangs.

16. The axial compressor of claim 9, wherein the stator segment most proximate said entry aperture comprises a plurality of actuating stator vanes.

17. A method of cooling an axial compressor comprising:
providing a plurality of compressor stages encased in a casing, said plurality of compressor stages positioned axially adjacent within said casing and each of said plurality of compressor stages comprising:
  a rotor segment comprising a bladed disc configured to be coupled to a rotatable shaft;
  a banded stator segment positioned axially adjacent said rotor segment, said stator segment comprising an outer flowpath ring, an inner flowpath ring, and a plurality of vanes extending between said rings and being spaced around the circumferences thereof, said stator segment further comprising one or more tangs extending radially outward from said outer flowpath ring to engage said casing and thereby space said outer flowpath ring radially inward from said casing forming an annulus between said casing and said outer flowpath ring;
providing a pathwpay between an entry pathway and an exit pathway, said entry pathway disposed in a first of said compressor stages and providing an air flowpath between the bulk flowpath of said compressor stage and the annulus of said stage and said exit pathway disposed in a second of said stages positioned axially downstream of said first stage, said exit pathway providing an air flowpath between the annulus of said stage and the exterior of said casing, wherein said entry pathway and said exit pathway are in fluid communication; and
introducing air flow through said pathway.

18. The method of claim 17, wherein the step of introducing air flow through said pathway comprises operating said compressor to establish a differential pressure between the air pressure proximate the entry pathway and the air pressure proximate the exit pathway.

19. The method of claim 17, further comprising the step of actuating a plurality of vanes of a stator segment most proximate said entry pathway to alter the vane angle relative to the direction of bulk flow.

20. The method of claim 17, wherein said annulus of one or more of said stator segments is substantially filled with a filler comprising a metallic foam, and wherein said filler at least partially defines said pathway.

* * * * *